US011972653B2

(12) United States Patent
Yang et al.

(10) Patent No.: US 11,972,653 B2
(45) Date of Patent: Apr. 30, 2024

(54) LOCK, VEHICLE PARKING SYSTEM, AND VEHICLE PARKING METHOD

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Shengwei Yang, Beijing (CN); Qi Zhang, Beijing (CN); Dong Wang, Beijing (CN); Jinlong Zheng, Beijing (CN); Lihong Yang, Beijing (CN); Sa Li, Beijing (CN); Xingjun Shu, Beijing (CN); Yajun Guo, Beijing (CN); Yafeng Wang, Beijing (CN); Jianye Tang, Beijing (CN); Gaowei Chen, Beijing (CN); Yanchao Zhang, Beijing (CN); Desheng Xiang, Beijing (CN); Xi Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 810 days.

(21) Appl. No.: 17/051,302

(22) PCT Filed: Mar. 12, 2020

(86) PCT No.: PCT/CN2020/078929
§ 371 (c)(1),
(2) Date: Oct. 28, 2020

(87) PCT Pub. No.: WO2020/215920
PCT Pub. Date: Oct. 29, 2020

(65) Prior Publication Data

US 2021/0248851 A1 Aug. 12, 2021

(30) Foreign Application Priority Data

Apr. 24, 2019 (CN) ........................ 201910336043.X

(51) Int. Cl.
*G07C 9/00* (2020.01)
*E05B 15/10* (2006.01)
(Continued)

(52) U.S. Cl.
CPC ........ *G07C 9/00896* (2013.01); *E05B 15/102* (2013.01); *E05B 47/0001* (2013.01);
(Continued)

(58) Field of Classification Search
CPC ............... G07C 9/00896; E05B 15/102; E05B 47/0001; E05B 71/00; E05B 2047/0058; G07B 15/063
See application file for complete search history.

(56) References Cited

U.S. PATENT DOCUMENTS 5,244,101 A * 9/1993 Palmer ..................... B62H 3/00
211/5
5,823,027 A * 10/1998 Glick ................. G07C 9/00904
70/263
(Continued)

FOREIGN PATENT DOCUMENTS

CN 106368529 A * 2/2017 .............. E05B 11/00
CN 106828674 A * 6/2017
(Continued)

OTHER PUBLICATIONS

International Search Report and Written Opinion for Application No. PCT/CN2020/078929, dated Jun. 9, 2020, 5 Pages.

*Primary Examiner* — Mark A Williams
(74) *Attorney, Agent, or Firm* — BROOKS KUSHMAN P.C.

(57) ABSTRACT

A lock, a vehicle parking system, and a vehicle parking method are provided. The lock includes a main body, a lock
(Continued)

switch, a lock controller, a lock communication circuit, and a battery. The battery is connected to the lock switch, the lock controller, and the lock communication circuit, and configured to supply electrical energy to the lock switch, the lock controller, and the lock communication circuit. The lock communication circuit is connected to the lock controller, and transmits a locking instruction or an unlocking instruction to the lock controller when receiving the locking instruction or the unlocking instruction from a second device located outside the lock. The lock controller is connected to the lock switch connected to the main body, and the lock controller controls, when receiving the locking instruction or the unlocking instruction, the main body to perform a locking operation or an unlocking operation through the lock switch.

16 Claims, 6 Drawing Sheets

(51) Int. Cl.

| | |
|---|---|
| ***E05B 47/00*** | (2006.01) |
| ***G07B 15/06*** | (2011.01) |
| *E05B 71/00* | (2006.01) |

(52) U.S. Cl.

CPC .... *G07B 15/063* (2013.01); *E05B 2047/0058* (2013.01); *E05B 71/00* (2013.01)

(56) References Cited

U.S. PATENT DOCUMENTS

| | | | | | |
|---|---|---|---|---|---|
| 8,061,499 | B2 * | 11/2011 | Khairallah | B62H 3/04 340/432 |
| 10,641,014 | B2 * | 5/2020 | Tepper | G07C 9/33 |
| 11,400,989 | B2 * | 8/2022 | Sørensen | B62H 5/10 |
| 2009/0178446 | A1 * | 7/2009 | Patterson | B62H 5/144 70/259 |
| 2014/0266588 | A1 * | 9/2014 | Majzoobi | B62H 5/20 340/5.61 |
| 2017/0036721 | A1 * | 2/2017 | Rinne | B62H 3/00 |
| 2017/0306656 | A1 * | 10/2017 | Lin | B62H 5/10 |
| 2021/0241552 | A1 * | 8/2021 | Jonely | G07C 9/00944 |
| 2021/0293075 | A1 * | 9/2021 | Oesterling | G06Q 50/30 |

FOREIGN PATENT DOCUMENTS

| | | | | | |
|---|---|---|---|---|---|
| CN | 106948667 | A | * | 7/2017 | |
| CN | 106948678 | A | * | 7/2017 | E05B 47/0001 |
| CN | 206657433 | U | | 11/2017 | |
| CN | 107687297 | A | * | 2/2018 | E05B 15/00 |
| CN | 107700970 | A | | 2/2018 | |
| CN | 108824985 | A | | 11/2018 | |
| CN | 108830984 | A | | 11/2018 | |
| CN | 110067453 | A | | 7/2019 | |
| WO | 02063830 | A2 | | 8/2002 | |

* cited by examiner

LOCK, VEHICLE PARKING SYSTEM, AND VEHICLE PARKING METHOD

CROSS-REFERENCE TO RELATED APPLICATIONS

This application is the U.S. national phase of PCT Application No. PCT/CN2020/078929 filed on Mar. 12, 2020, which claims priority to Chinese Patent Application No. 201910336043.X, filed on Apr. 24, 2019, which are incorporated herein by reference in their entireties.

TECHNICAL FIELD

The present disclosure relates to the field of bicycle sharing technology, and in particular to a lock, a vehicle parking system, and a vehicle parking method.

BACKGROUND

Currently, as a common tool for people to travel a short distance, a shared bicycle brings great convenience to people's travel. However, with an increase in the number of the shared bicycles, many problems are correspondingly produced, especially the random parking of the shared bicycle. The random parking of the shared bicycle not only destroys a normal street environment, but also causes many penalties in terms of public security management.

SUMMARY

The present disclosure provides a lock, a vehicle parking system, and a vehicle parking method.

According to a first aspect of an embodiment of the present disclosure, a vehicle lock is provided, including a main body, a lock switch, a lock controller, a lock communication circuit, and a battery. The battery is connected to the lock switch, the lock controller, and the lock communication circuit, and is configured to supply electrical energy to the lock switch, the lock controller, and the lock communication circuit. The lock communication circuit is connected to the lock controller, and configured to transmit a locking instruction or an unlocking instruction to the lock controller when receiving the locking instruction or the unlocking instruction from a second device located outside the lock. The lock controller is connected to the lock switch, the lock switch is connected to the main body, and the lock controller is configured to control, when receiving the locking instruction or the unlocking instruction, the main body to perform a locking operation or an unlocking operation through the lock switch.

In some embodiments, the main body includes a shell, a lock pin, and a movable lock bolt, the lock bolt is provided with a first groove and a second groove; and the lock switch is connected to the lock pin and is configured to control the lock pin to be in a first state or a second state. When the lock switch controls the lock pin to be in the first state, an end of the lock pin proximate to the lock bolt is located in the first groove, and the lock is in a locked state. When the lock switch controls the lock pin to be in the second state, the end of the lock pin proximate to the lock bolt is located in the second groove, and the lock is in an unlocked state.

In some embodiments, the lock includes a lug connected to the lock bolt, and the lug is configured to drive the lock bolt to move to enable the lock to be in the locked state when the main body performs the locking operation.

In some embodiments, the second groove and the lug are arranged adjacently, and the lug is further away from the lock pin than the second groove.

In some embodiments, the lock bolt is of a curved shape, and the first groove, the second groove, and the lug are distributed counterclockwise on the lock bolt.

In some embodiments, the lock further includes a kinetic energy charging device connected to the battery, and the kinetic energy charging device is configured to convert kinetic energy into electric energy to charge the battery.

In some embodiments, the lock is arranged on the vehicle, and configured to lock or unlock the vehicle, and the kinetic energy charging device is configured to convert a part of kinetic energy generated during a driving process of the vehicle into electric energy to charge the battery.

In some embodiments, the lock further includes an audio player circuit connected to the lock controller, wherein the lock controller is configured to play, when receiving the locking instruction, a locking prompt audio file through the audio player circuit.

According to a second aspect of the embodiments of the present disclosure, a vehicle parking system is provided. The vehicle parking system includes a radio frequency read-write device, a server connected to the radio frequency read-write device, an electronic label configured to be read and written by the radio frequency read-write device, and the lock as described above. The lock is connected to the server, the lock and the electronic label are correspondingly arranged on a same vehicle, the lock is configured to lock or unlock the vehicle, and the server is the second device. The electronic label is configured to store identification information, the identification information includes vehicle information of the vehicle on which the electronic label is arranged, and/or lock information of the lock corresponding to the electronic label. The radio frequency read-write device is configured to transmit a radio frequency signal, detect whether an electronic label enters a preset vehicle parking region, and obtain identification information stored in the electronic label when detecting that the electronic label enters the preset vehicle parking region, and transmit the identification information to the server. The server is configured to receive the identification information transmitted by the radio frequency read-write device, and transmit the locking instruction to the lock corresponding to the identification information. The lock is configured to lock the vehicle when receiving the locking instruction.

In some embodiments, the vehicle parking system includes an intelligent terminal connected to the server; the lock is further configured to transmit a locking completion instruction to the server after locking the vehicle; the server is further configured to charge a fee based on the locking completion instruction, and transmit fee information to the intelligent terminal; and the intelligent terminal is configured to pay the fee based on the fee information.

According to a third aspect of the embodiments of the present disclosure, a vehicle parking method is provided, which is operable by the vehicle parking system as described above and includes: transmitting, by the radio frequency read-write device, a radio frequency signal, detecting, by the radio frequency read-write device, whether the electronic label enters the preset vehicle parking region, and obtaining, by the radio frequency read-write device, the identification information stored in the electronic label when detecting that the electronic label enters the preset vehicle parking region, and transmitting, by the radio frequency read-write device, the identification information to the server; receiving, by the server, the identification information, and transmitting, by the server, the locking instruction to the lock corresponding to the identification information based on the identification information; and locking, by the lock, the vehicle when receiving the locking instruction.

In some embodiments, the vehicle parking system further includes an intelligent terminal connected to the server; and after locking by the lock the vehicle when receiving the locking instruction, the vehicle parking method further includes: transmitting, by the lock, a locking completion instruction to the server; charging, by the server, a fee based on the locking completion instruction, and transmitting, by the server, fee information to the intelligent terminal; and paying, by the intelligent terminal, the fee based on the fee information.

It should be understood that the foregoing general descriptions and the following detailed descriptions are merely exemplary and explanatory, and cannot limit the present disclosure.

BRIEF DESCRIPTION OF DRAWINGS

In order to illustrate the technical solutions of the present disclosure or the related art in a clearer manner, the drawings desired for the embodiments or the related art will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to reflect any actual scale.

DETAILED DESCRIPTION

In order to make the objects, the technical solutions and the advantages of the embodiments of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection or communication connection, direct or indirect, wired or wireless, rather than to be limited to physical or mechanical connection. Such words as "on", "under", "left" and "right" are merely used to represent relative position relationship, and when an absolute position of the object is changed, the relative position relationship will be changed accordingly.

Figure 1:
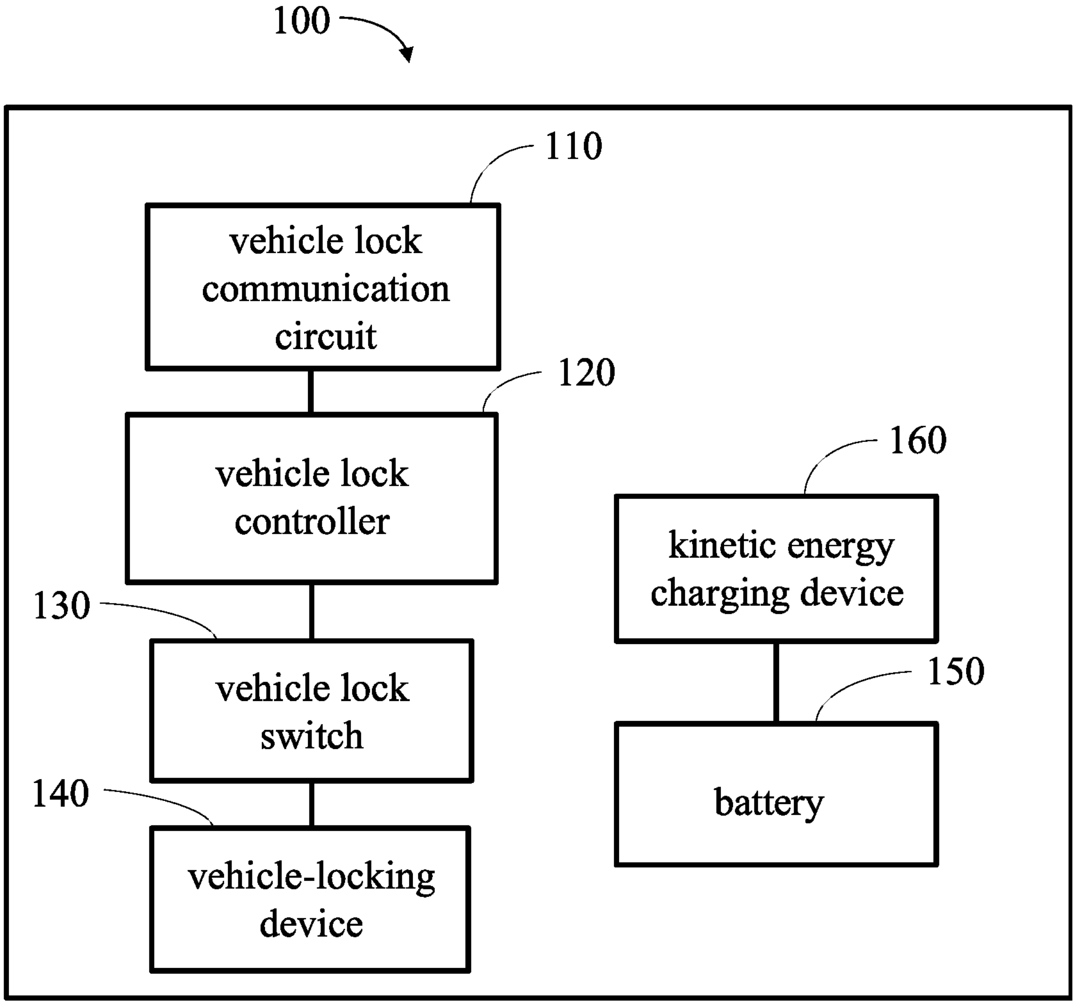
FIG. 1 is a schematic block diagram of a vehicle lock according to an embodiment of the present disclosure.

Optionally, the lock in the present application is arranged on a vehicle (such as a shared bicycle), and can be a vehicle lock used to lock or unlock the vehicle. FIG. 1 is a schematic diagram of a vehicle lock 100 according to an embodiment of the present disclosure. Optionally, the vehicle lock 100 is used to lock the vehicle when the vehicle is in a preset vehicle parking region.

Figure 2:
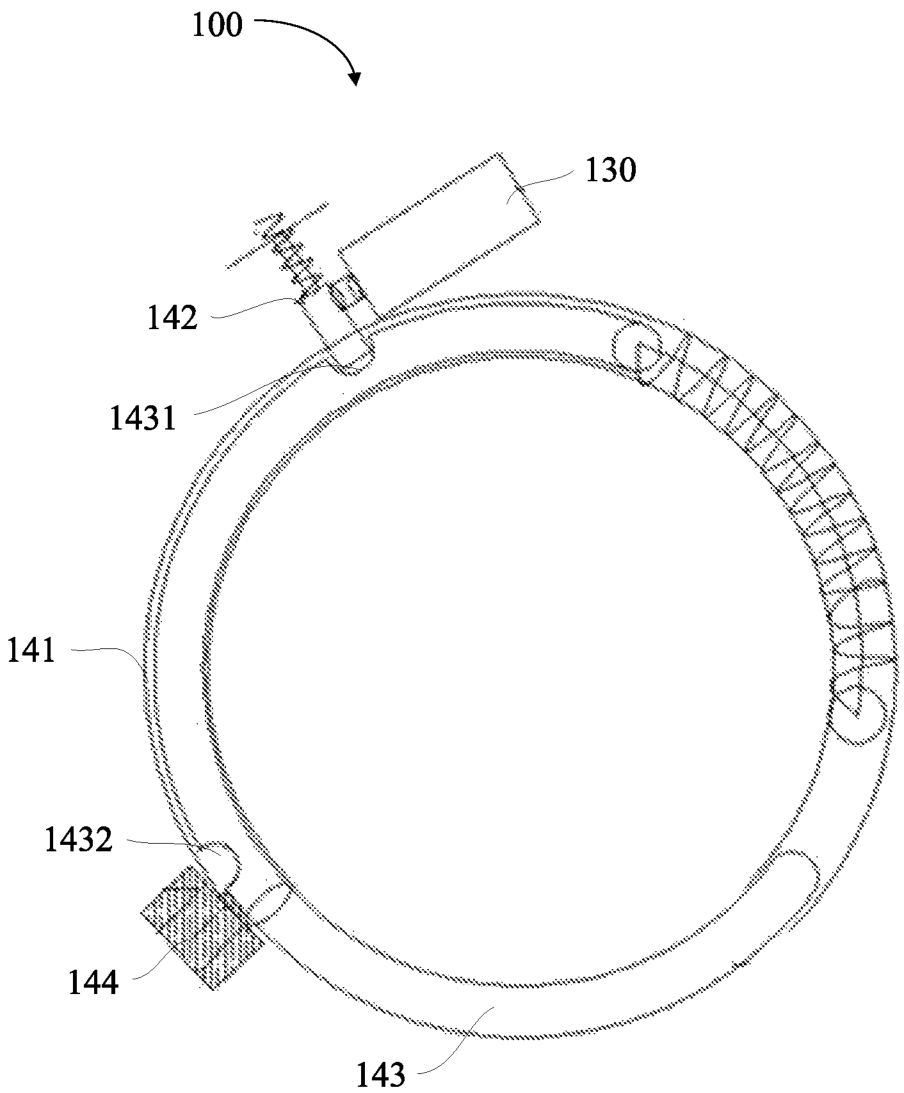
FIG. 2 is a schematic structural diagram of a vehicle lock according to an embodiment of the present disclosure.

Referring to FIG. 1, and also referring to FIG. 2 when necessary, the vehicle lock 100 includes a vehicle-locking device 140, a vehicle lock switch 130, a vehicle lock controller 120, a vehicle lock communication circuit 110, and a battery 150.

The battery 150 is connected to the vehicle lock switch 130, the vehicle lock controller 120, and the vehicle lock communication circuit 110, and can supply electrical energy to the vehicle lock switch 130, the vehicle lock controller 120, and the vehicle lock communication circuit 110. The battery 150 can be a power supply member connected to the vehicle lock switch 130, the vehicle lock controller 120, and the vehicle lock communication circuit 110 simultaneously, or can be a plurality of power supply members connected to the vehicle lock switch 130, the vehicle lock controller 120, and the vehicle lock communication circuit 110, respectively.

The vehicle lock communication circuit 110 is connected to the vehicle lock controller 120. The vehicle lock communication circuit 110 can transmit a vehicle-locking instruction or a vehicle-unlocking instruction to the vehicle lock controller 120 when receiving the vehicle-locking instruction or the vehicle-unlocking instruction. The vehicle lock controller 120 is connected to the vehicle lock switch 130, and the vehicle lock switch 130 is connected to the vehicle-locking device 140. When receiving the vehicle-locking instruction or the vehicle-unlocking instruction from the vehicle lock communication circuit 110, the vehicle lock controller 120 controls, by using the vehicle lock switch 130, the vehicle-locking device 140 to lock or unlock the vehicle.

In some embodiments, the vehicle lock communication circuit 110 can be a communication device in the Global System for Mobile Communications (GSM), a communication device in the Universal Mobile Telecommunications System (UMTS), a Long Term Evolution (LTE) communication device, a Long Term Evolution-Advanced (LTE-A) communication device, a 5G communication device, or the like.

In some embodiments, the vehicle lock switch 130 can be a micro switch.

Further, as shown in FIG. 2, in some embodiments, the vehicle-locking device 140 includes a shell 141, a lock pin 142, and a movable lock bolt 143. The vehicle lock 100 can include a horseshoe-shaped lock. The shell 141 is of an unclosed ring shape. The lock bolt 143 is also of an unclosed ring shape. At least a part of the lock bolt 143 is movable in the shell 141. The lock bolt 143 can be provided with a first groove 1431 and a second groove 1432 as shown in FIG. 2. The vehicle lock switch 130 is connected to the lock pin 142, and is configured to control the lock pin 142 to fit the first groove 1431 or fit the second groove 1432. When the vehicle lock 100 is in a locked state, the lock pin 142 fits the first groove 1431, and an end of the lock pin 142 that is proximate to the lock bolt 143 is located in the first groove 1431. When the vehicle lock 100 is in an unlocked state, the lock pin 142 fits the second groove 1432, and the end of the lock pin 142 that is proximate to the lock bolt 143 is located in the second groove 1432.

Specifically, in the case that the vehicle lock 100 is in the unlocked state, the vehicle lock communication circuit 110 of the vehicle lock 100 transmits the vehicle-locking instruction to the vehicle lock controller 120 when the vehicle lock communication circuit 110 receives the vehicle-locking instruction. The vehicle lock controller 120 drives, through the vehicle lock switch 130, the lock pin 142 to spring out of the second groove 1432, so that the lock bolt 143 can move counterclockwise to be in a locked state, that is, the lock bolt 143 can move to a position where the first groove 1431 is aligned with the lock pin 142. In this way, the end of the lock pin 142 that is proximate to the lock bolt 143 can be inserted into the first groove 1431, so that the vehicle lock 100 locks the vehicle. In the case that the vehicle lock 100 is in the locked state, the vehicle lock communication circuit 110 of the vehicle lock 100 transmits the vehicle-unlocking instruction to the vehicle lock controller 120 when the vehicle lock communication circuit 110 receives the vehicle-unlocking instruction. As a result, the vehicle lock controller 120 may drive, through the vehicle lock switch 130, the end of the lock pin 142 to spring out of the first groove 1431, so that the lock bolt 143 can move clockwise to be in the unlocked state, that is, the lock bolt 143 can move to a position where the second groove 1432 is aligned with the lock pin 142. In this way, the end of the lock pin 142 that is proximate to the lock bolt 143 can be inserted into the second groove 1432 so that the vehicle lock 100 unlocks the vehicle.

It should be noted that, when the vehicle-locking instruction is not received, the end of the lock pin 142 that is proximate to the lock bolt 143 remains in the second groove 1432. As a result, the lock pin 142 is stuck in the second groove 1432, and a user cannot perform a vehicle locking operation.

Further, the vehicle lock 100 includes a lug 144 connected to the lock bolt 143. When the vehicle-locking device 140 locks the vehicle, the lug 144 can drive the lock bolt 143 to move to enable the lock to be in the locked state. Specifically, when the vehicle lock 100 locks the vehicle, that is, when the vehicle-locking device 140 locks the vehicle, the lock pin 142 springs out of the second groove 1432, so that the user can operate the lug 144 to drive the lock bolt 143 to move counterclockwise to be in the locked state. It should be noted that, when an unlocking operation is performed, that is, when the vehicle-locking device 140 unlocks the vehicle, the end of the lock pin 142 springs out of the first groove 1431, and then the lock bolt 143 can automatically spring out clockwise to be in the unlocked state.

Further, in some embodiments, the second groove 1432 and the lug 144 are arranged adjacently, and the lug 144 is further away from the lock pin 142 than the second groove 1432. In this way, when the vehicle lock 100 unlocks or locks the vehicle, the fitting between the second groove 1432 and the lock pin 142 is prevented from being adversely affected by the lug 144. In addition, as shown in FIG. 2, the first groove 1431, the second groove 1432, and the lug 144 are approximately distributed counterclockwise in the lock bolt 143.

Further, in some embodiments, the vehicle lock 100 includes a kinetic energy charging device 160 connected to the battery 150, and the kinetic energy charging device 160 can convert a part of kinetic energy generated during a driving process of the vehicle into electric energy to charge the battery 150.

Figure 7:
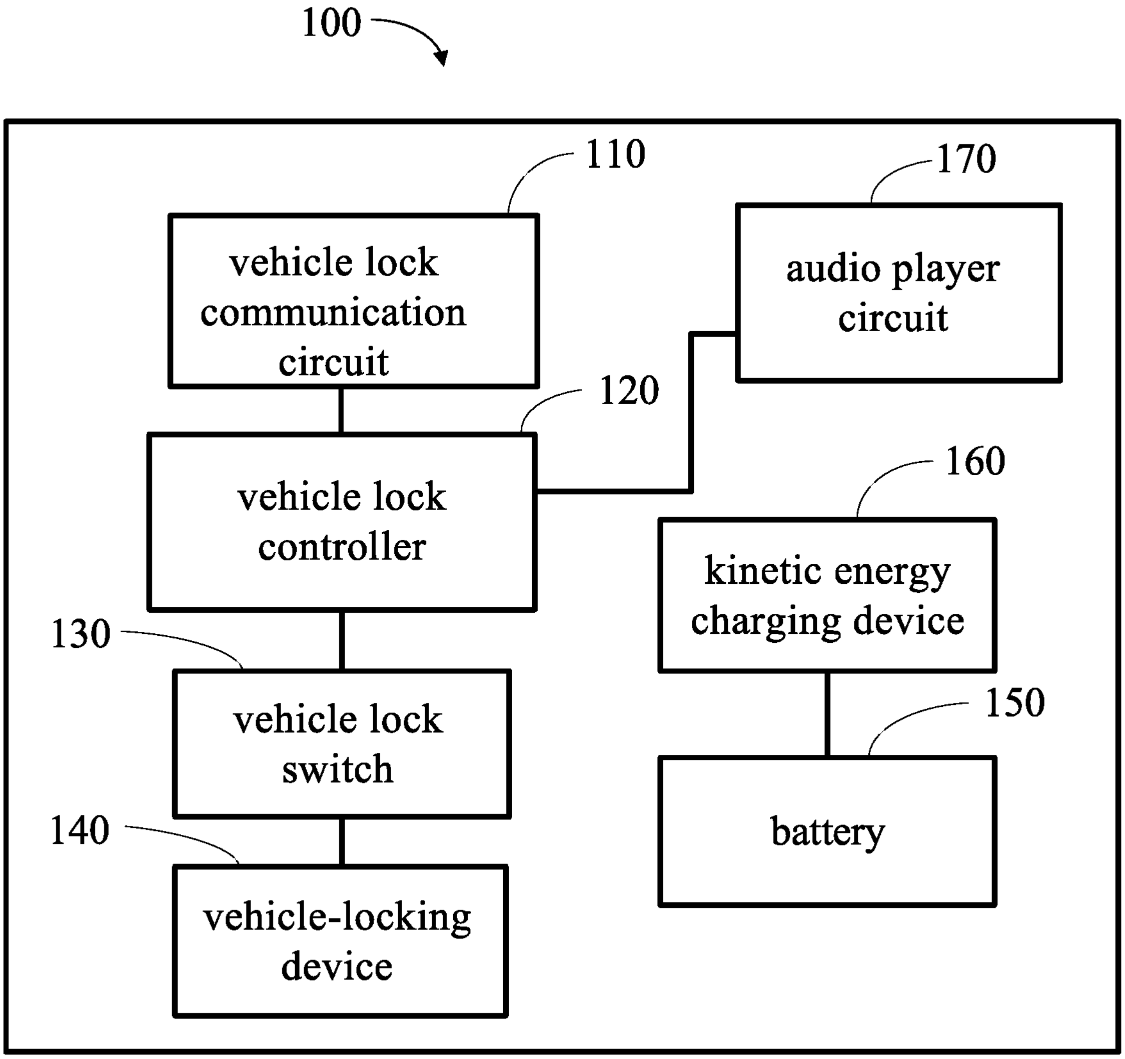
FIG. 7 is a schematic block diagram of another vehicle lock according to an embodiment of the present disclosure.

Further, in some embodiments, the vehicle lock 100 includes an audio player circuit 170 connected to the vehicle lock controller 120, as shown in FIG. 7. The audio player circuit 170 can include a ringing device. When receiving the vehicle-locking instruction, the vehicle lock controller 120 plays a vehicle-locking prompt audio file by using the audio player circuit 170. The vehicle-locking prompt audio file can be an audio file pre-stored in the ringing device, can be a prompt voice audio file, e.g., "please lock the vehicle", or can be a simpler audio file, e.g., a file of the sound "ding".

According to the vehicle lock provided in the foregoing embodiments, the vehicle lock controller 120 controls and cooperates with the vehicle lock communication circuit 110 to control a locking function and an unlocking function of the vehicle lock, so as to prevent a user from performing a vehicle-locking operation when the vehicle lock does not receive the vehicle locking instruction, thereby avoiding a problem that the user parks the vehicle randomly.

Figure 3:
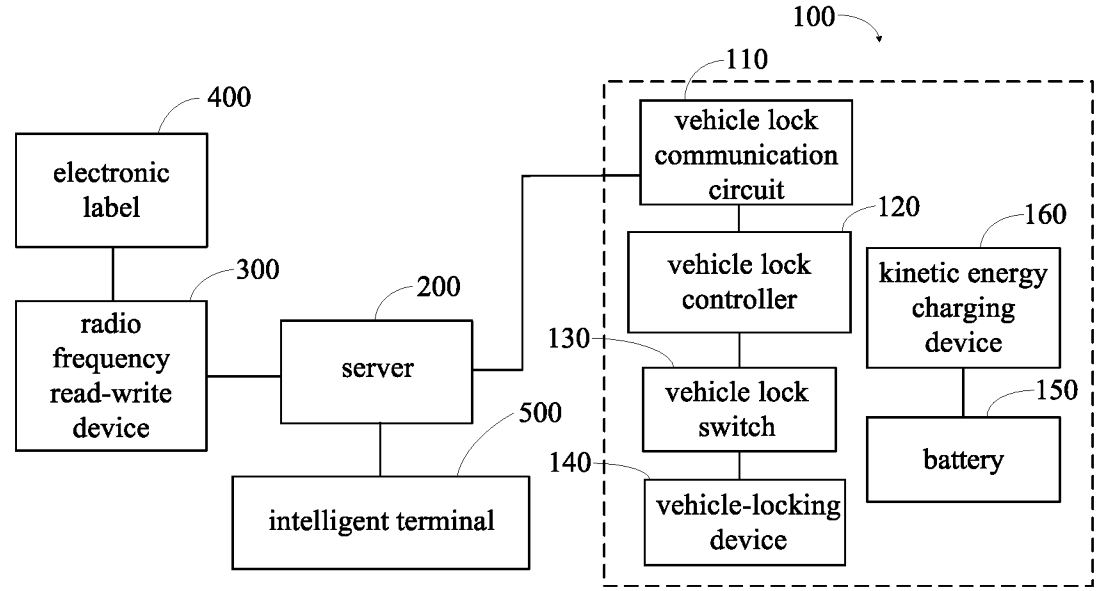
FIG. 3 is a schematic block diagram of a vehicle parking system according to an embodiment of the present disclosure.

The present disclosure further provides a vehicle parking system. FIG. 3 is a block diagram of a vehicle parking system according to an embodiment of the present disclosure. Referring to FIG. 3, and referring to FIG. 4 when necessary, the vehicle parking system includes a radio frequency read-write device 300, a server 200 connected to the radio frequency read-write device, an electronic label 400 that can be read and written by the radio frequency read-write device, and the vehicle lock 100 described above. The vehicle lock 100 is connected to the server 200, and the vehicle lock 100 and the electronic label 400 are correspondingly arranged on the same vehicle. Optionally, the vehicle lock 100 is wirelessly connected to the server by using various wireless communications technologies such as WiFi, Bluetooth, second Generation (2G) communications technology, a General Packet Radio Service (GPRS), third Generation (3G) communications technology, fourth Generation (4G) communications technology, 5G communications technology, or the like.

The electronic label 400 pre-stores identification information. The identification information includes at least one piece of information for identification, such as vehicle information (such as a vehicle number or a vehicle brand) of a vehicle on which the electronic label 400 is arranged, and vehicle lock information of the vehicle lock 100 corresponding to the electronic label 400. The identification information can be pre-written into the electronic label 400 by using the radio frequency read-write device 300, and can be read by the radio frequency read-write device 300.

The radio frequency read-write device 300 is configured to transmit a radio frequency signal, detect whether the electronic label 400 enters a preset vehicle parking region, and obtain identification information stored in the electronic label 400 when it is detected that the electronic label 400 enters the preset vehicle parking region, and transmit the identification information to the server 200.

Figure 4:
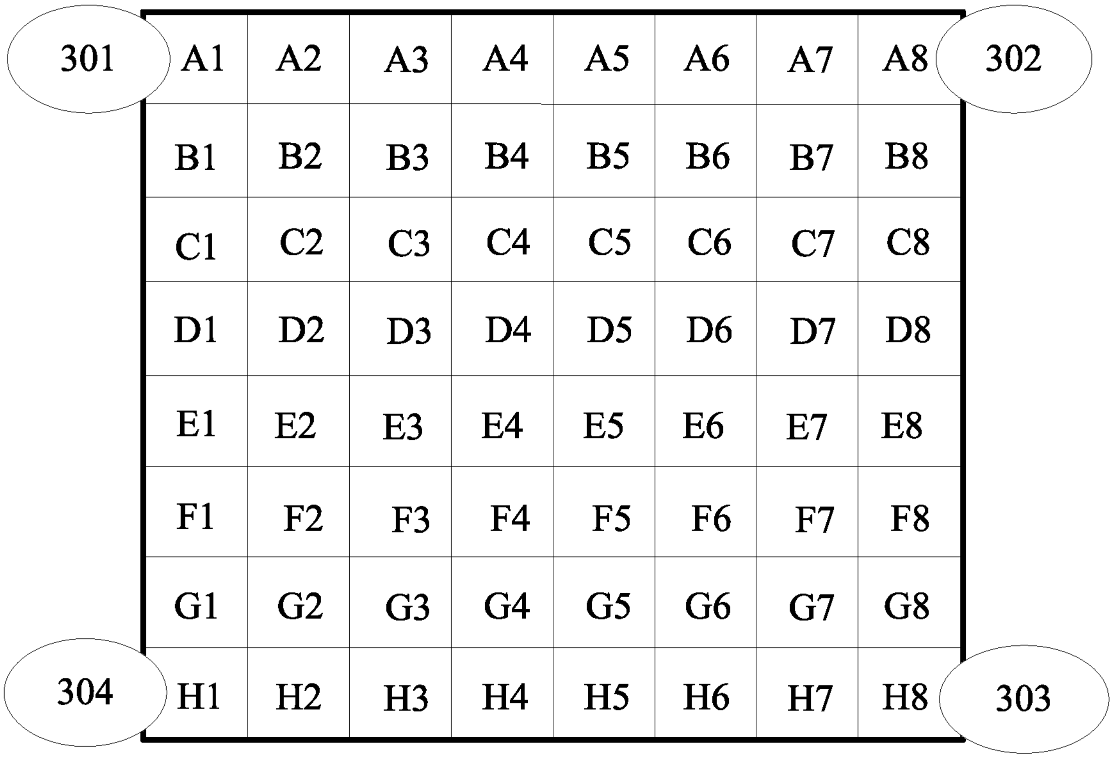
FIG. 4 is a schematic diagram of a radio frequency read-write device arranged in a vehicle parking region according to an embodiment of the present disclosure.

One or more radio frequency read-write devices 300 can be used. As shown in FIG. 4, the vehicle parking region is optionally divided into a plurality of sub-regions including sub-regions from sub-regions A1-A8 to sub-regions H1-H8. The radio frequency read-write device 300 can include a plurality of radio frequency read-write devices 301, 302, 303, and 304 that are arranged at corners of the vehicle parking region. The plurality of radio frequency read-write devices 301, 302, 303, and 304 can detect whether the electronic label 400 enters the vehicle parking region, so as to determine whether a vehicle carrying the electronic label 400 enters the vehicle parking region.

The server 200 is configured to receive identification information transmitted by the radio frequency read-write device 300, and transmit a vehicle-locking instruction to the vehicle lock 100 corresponding to the identification information.

The vehicle lock 100 is configured to lock the vehicle when receiving a vehicle-locking instruction transmitted by the server 200.

It should be noted that when the vehicle does not enter the vehicle parking region, the server 200 does not transmit the vehicle-locking instruction to the vehicle lock 100, and the vehicle lock 100 cannot obtain the vehicle-locking instruction. Because the second groove 1432 is arranged, the user cannot pull out the lock bolt 143 when the user intends to lock the vehicle. The lock pin 142 cannot spring out of the second groove 1432 and the user cannot pull the lock bolt 143 to lock the vehicle, until the server 200 provides the vehicle-locking instruction in a specified vehicle parking region.

Further, it should be noted that the server 200 and the radio frequency read-write device 300 can be provided with a server communication circuit and a read-write device communication circuit, respectively. In this way, the communication (optionally, the wireless communication) between the radio frequency read-write device 300 and the server 200, as well as the communication (optionally, the wireless communication) between the server 200 and the vehicle lock 100, can be implemented through the respective communication circuits, so as to transmit and exchange data. In some embodiments, the server communication circuit and the read-write device communication circuit can be a GSM communication device, a UMTS communication system, an LTE communication device, an LTE-A communication device, a fifth Generation (5G) communication device, or the like.

Further, in an embodiment, as shown in FIG. 3, the vehicle parking system includes an intelligent terminal 500 connected to the server 200. The vehicle lock 100 is further configured to transmit a vehicle-locking completion instruction to the server 200 after locking the vehicle. The server 200 charges a fee based on the vehicle-locking completion instruction, and transmits fee information to the intelligent terminal 500. The intelligent terminal 500 pays the fee based on the fee information.

In some embodiments, the vehicle locking switch vibrates after the vehicle lock 100 lock a vehicle, so as to generate an electrical signal. The electrical signal can be considered as the vehicle-locking completion instruction. Further, the vehicle lock communication circuit 110 of the vehicle lock 100 can feed back the vehicle-locking completion instruction to the server 200, so that the server 200 can charge the fee based on the vehicle-locking completion instruction.

The intelligent terminal 500 can include a terminal device such as a smartphone or a tablet computer that can interact with the server and can settle an account.

Further, vehicle application software can be installed on the intelligent terminal. Correspondingly, an identification code such as a barcode, a two-dimensional code and the like can be arranged on the vehicle. When unlocking the vehicle, the intelligent terminal can scan the code on the vehicle through the application software, to establish a connection between the intelligent terminal and the server 200. The server 200 further transmits a vehicle-unlocking instruction to the vehicle lock communication circuit 110 of the vehicle lock 100 through an internal server communication circuit. The vehicle lock communication circuit 110 transmits the vehicle-unlocking instruction to the vehicle lock controller 120, so that the controller 120 controls the vehicle lock switch 130 to drive the lock pin 142 of the vehicle-locking device 140 to spring up, and the lock bolt 143 of the vehicle-locking device 140 naturally springs back to unlock the vehicle.

In the vehicle parking system provided in the foregoing embodiments, the radio frequency read-write device, the server connected to the radio frequency read-write device, the electronic label that can be read and written by the radio frequency read-write device, and the vehicle lock may cooperate with each other. In this way, when the vehicle lock in the vehicle parking system is located in the vehicle parking region, a locking function of the vehicle lock can be controlled to prevent a user from performing a vehicle-locking operation when the vehicle lock does not receive an instruction that the vehicle can be locked, thereby preventing the user from randomly parking the vehicle.

Figure 5:
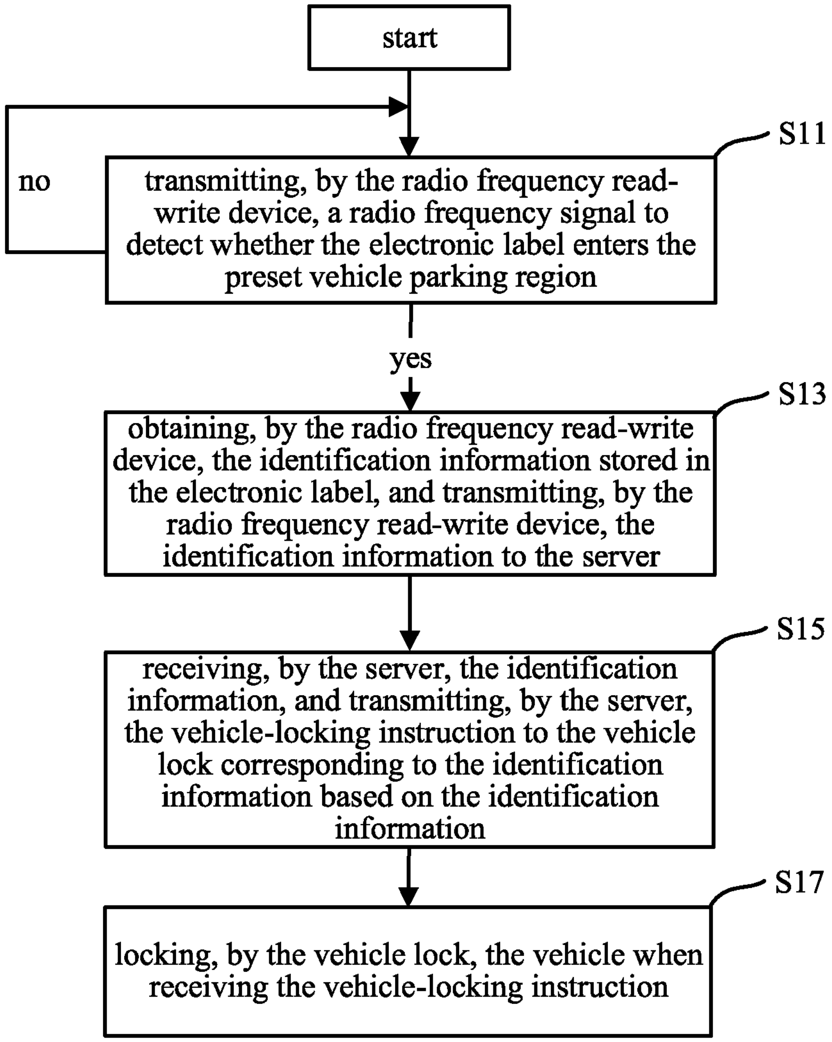
FIG. 5 is a flowchart of a vehicle parking method according to an embodiment of the present disclosure.

In addition, the present disclosure further provides a vehicle parking method. The vehicle parking method can be applied to a vehicle parking system described above. As shown in FIG. 5, the vehicle parking method includes the following steps.

Step S11: transmitting, by the radio frequency read-write device, a radio frequency signal to detect whether the electronic label enters the preset vehicle parking region.

Step S13: obtaining, by the radio frequency read-write device, the identification information stored in the electronic label when detecting that the electronic label enters the preset vehicle parking region, and transmitting, by the radio frequency read-write device, the identification information to the server.

Step S15: receiving, by the server, the identification information, and transmitting, by the server, the vehicle-locking instruction to the vehicle lock corresponding to the identification information based on the identification information.

Step S17: locking, by the vehicle lock, the vehicle when receiving the vehicle-locking instruction.

Figure 6:
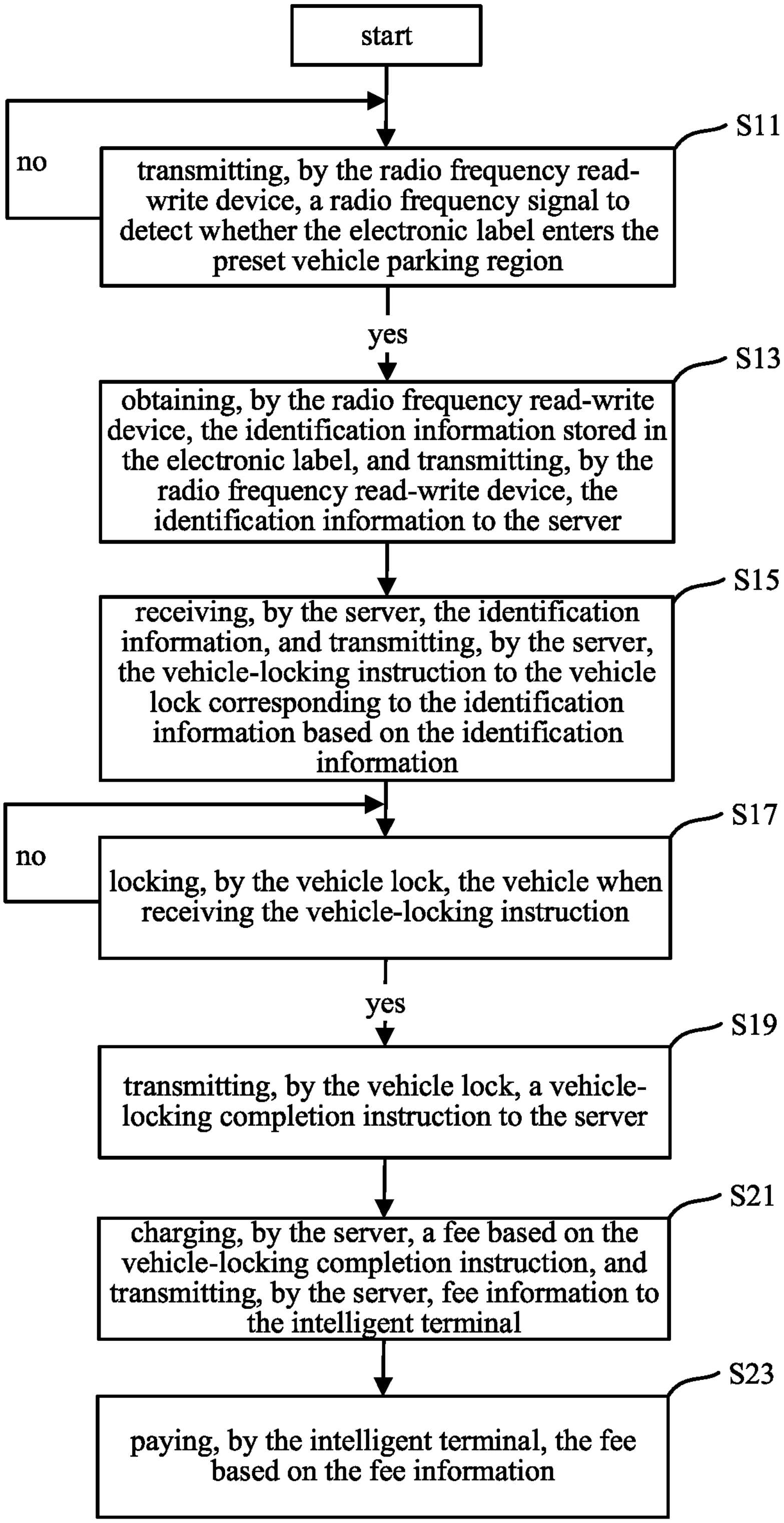
FIG. 6 is a flowchart of another vehicle parking method according to an embodiment of the present disclosure.

Further, in an embodiment in which the vehicle parking system further includes an intelligent terminal connected to the server, as shown in FIG. 6, the vehicle parking method can further include the following steps after Step S17.

Step S19: transmitting, by the vehicle lock, a vehicle-locking completion instruction to the server.

Step S21: charging, by the server, a fee based on the vehicle-locking completion instruction, and transmitting, by the server, fee information to the intelligent terminal.

Step S23: paying, by the intelligent terminal, the fee based on the fee information.

In the present disclosure, the terms "first" and "second" are merely used for description and cannot be understood as indicative or implied of relative importance. Unless otherwise expressly defined, the terms "a plurality of" and "multiple" means two or more.

The person skilled in the art can easily think of other embodiments of the present disclosure after reading the specification and practicing the present disclosure disclosed herein. The present disclosure is intended to cover any variation, function, or adaptive change of the present disclosure. These variations, functions, or adaptive changes comply with general principles of the present disclosure, and include common knowledge or a general technical means in the art that is not disclosed in the present disclosure. The specification and the embodiments are merely considered as being illustrative, and the actual scope and spirit of the present disclosure are specified in the following claims.

It should be understood that the present disclosure is not limited to the accurate structures that are described above and shown in the accompanying drawings, and various modifications and changes can be made without departing from the scope of the present disclosure. The scope of the present disclosure is limited only by the appended claims.

What is claimed is:

1. A vehicle lock, comprising: a vehicle-locking device, a vehicle lock switch, a vehicle lock controller, a vehicle lock communication circuit, and a battery, wherein the battery is connected to the vehicle lock switch, the vehicle lock controller, and the vehicle lock communication circuit, and is configured to supply electrical energy to the vehicle lock switch, the vehicle lock controller, and the vehicle lock communication circuit;

the vehicle lock communication circuit is connected to the vehicle lock controller, and configured to transmit a vehicle-locking instruction or a vehicle-unlocking instruction to the vehicle lock controller when receiving the vehicle-locking instruction or the vehicle-unlocking instruction from a second device located outside the vehicle lock; and the vehicle lock controller is connected to the vehicle lock switch, the vehicle lock switch is connected to the vehicle-locking device, and the vehicle lock controller is configured to control, when receiving the vehicle-locking instruction or the vehicle-unlocking instruction, the vehicle-locking device to perform a vehicle locking operation or an unlocking operation through the vehicle lock switch;

wherein the vehicle-locking device comprises a shell, a lock pin, and a movable lock bolt, the shell is of an unclosed ring shape, the lock bolt is also of an unclosed ring shape, at least a part of the lock bolt is movable in the shell, the lock bolt can be enclosed with the lock shell to form a closed ring shape, the lock bolt is provided with a first groove and a second groove; and the vehicle lock switch is connected to the lock pin and configured to control the lock pin to be in a first state or a second state;

when the vehicle lock switch controls the lock pin to be in the first state, an end of the lock pin proximate to the lock bolt is located in the first groove, and the vehicle lock is in a locked state; and when the vehicle lock switch controls the lock pin to be in the second state, the end of the lock pin proximate to the lock bolt is located in the second groove, and the vehicle lock is in an unlocked state.

2. The vehicle lock according to claim 1, wherein the vehicle lock comprises a lug connected to the lock bolt, and the lug is configured to drive the lock bolt to move to enable the vehicle lock to be in the locked state when the vehicle-locking device performs the vehicle locking operation.

3. The vehicle lock according to claim 2, wherein the second groove and the lug are arranged adjacently, and the lug is further away from the lock pin than the second groove.

4. The vehicle lock according to claim 1, further comprising a kinetic energy charging device connected to the battery, wherein the kinetic energy charging device is configured to convert kinetic energy into electric energy to charge the battery.

5. The vehicle lock according to claim 4, wherein the vehicle lock is arranged on a vehicle, and the kinetic energy charging device is configured to convert a part of kinetic energy generated during a driving process of the vehicle into electric energy to charge the battery.

6. The vehicle lock according to claim 1, further comprising an audio player circuit connected to the vehicle lock controller, wherein the vehicle lock controller is configured to play, when receiving the vehicle-locking instruction, a vehicle-locking prompt audio file through the audio player circuit.

7. A vehicle parking system, comprising a radio frequency read-write device, a server connected to the radio frequency read-write device, an electronic label configured to be read and written by the radio frequency read-write device, and the vehicle lock according to claim 1, wherein the vehicle lock is in communication connection with the server, the vehicle lock and the electronic label are correspondingly arranged on the same vehicle, and the server is the second device;

the electronic label is configured to store identification information, the identification information comprises vehicle information of the vehicle on which the electronic label is arranged, and/or vehicle lock information of the vehicle lock corresponding to the electronic label;

the radio frequency read-write device is configured to transmit a radio frequency signal, detect whether an electronic label enters a preset vehicle parking region, and obtain identification information stored in the electronic label when detecting that the electronic label enters the preset vehicle parking region, and transmit the identification information to the server;

the server is configured to receive the identification information transmitted by the radio frequency read-write device, and transmit the vehicle-locking instruction to the vehicle lock corresponding to the identification information; and the vehicle lock is configured to lock the vehicle when receiving the vehicle-locking instruction.

8. The vehicle parking system according to claim 7, wherein the vehicle parking system comprises an intelligent terminal in communication connection with the server; the vehicle lock is further configured to transmit a vehicle-locking completion instruction to the server after locking the vehicle; the server is further configured to charge a fee based on the vehicle-locking completion instruction, and transmit fee information to the intelligent terminal; and the intelligent terminal is configured to pay the fee based on the fee information.

9. A vehicle parking method, which is operable by the vehicle parking system according to claim 7, and comprises:

transmitting, by the radio frequency read-write device, a radio frequency signal to detect whether the electronic label enters the preset vehicle parking region, and obtaining, by the radio frequency read-write device, the identification information stored in the electronic label when detecting that the electronic label enters the preset vehicle parking region, and transmitting, by the radio frequency read-write device, the identification information to the server;

receiving, by the server, the identification information, and transmitting, by the server, the vehicle-locking instruction to the vehicle lock corresponding to the identification information based on the identification information; and locking, by the vehicle lock, the vehicle when receiving the vehicle-locking instruction.

10. The vehicle parking method according to claim 9, wherein the vehicle parking system further comprises an intelligent terminal in communication connection with the server; and after locking by the vehicle lock the vehicle when receiving the vehicle-locking instruction, the vehicle parking method further comprises:

transmitting, by the vehicle lock, a vehicle-locking completion instruction to the server;

charging, by the server, a fee based on the vehicle-locking completion instruction, and transmitting, by the server, fee information to the intelligent terminal; and by the intelligent terminal, the fee based on the fee information.

11. The vehicle parking system according to claim 7, wherein the vehicle lock comprises a lug connected to the lock bolt, and the lug is configured to drive the lock bolt to move to enable the vehicle lock to be in the locked state when the vehicle-locking device performs the vehicle locking operation.

12. The vehicle parking system according to claim 11, wherein the second groove and the lug are arranged adjacently, and the lug is further away from the lock pin than the second groove.

13. The vehicle parking system according to claim 7, wherein the vehicle lock further comprises a kinetic energy charging device connected to the battery, wherein the kinetic energy charging device is configured to convert kinetic energy into electric energy to charge the battery.

14. The vehicle parking system according to claim 13, wherein the vehicle lock is arranged on a vehicle, and the kinetic energy charging device is configured to convert a part of kinetic energy generated during a driving process of the vehicle into electric energy to charge the battery.

15. The vehicle parking system according to claim 7, wherein the vehicle lock further comprises an audio player circuit connected to the vehicle lock controller, wherein the vehicle lock controller is configured to play, when receiving the vehicle-locking instruction, a vehicle-locking prompt audio file through the audio player circuit.

16. A vehicle parking method, which is operable by the vehicle parking system according to claim 8, and comprises:

transmitting, by the radio frequency read-write device, a radio frequency signal to detect whether the electronic label enters the preset vehicle parking region, and obtaining, by the radio frequency read-write device, the identification information stored in the electronic label when detecting that the electronic label enters the preset vehicle parking region, and transmitting, by the radio frequency read-write device, the identification information to the server;

receiving, by the server, the identification information, and transmitting, by the server, the vehicle-locking instruction to the vehicle lock corresponding to the identification information based on the identification information; and locking, by the vehicle lock, the vehicle when receiving the vehicle-locking instruction.

* * * * *